June 24, 1924. Re. 15,867

F. G. SEIFARTH

ROLLER BEARING

Original Filed July 14, 1923

Witness:

Chas. R. Kourch.

Inventor,

Frederick George Seifarth.

By Benjamin, Woodhouse & Kennedy Attys

Reissued June 24, 1924. Re. 15,867

UNITED STATES PATENT OFFICE.

FREDERICK GEORGE SEIFARTH, OF CHICAGO, ILLINOIS, ASSIGNOR, BY DIRECT AND MESNE ASSIGNMENTS, TO PRECISION DISK ROLLER BEARINGS COMPANY, OF CHICAGO, ILLINOIS, A CORPORATION OF ILLINOIS.

ROLLER BEARING.

Original No. 1,487,185, dated March 18, 1924, Serial No. 651,614, filed July 14, 1923. Application for reissue filed April 24, 1924. Serial No. 708,832.

*To all whom it may concern:*

Be it known that I, FREDERICK GEORGE SEIFARTH, a citizen of the United States, and a resident of Chicago, in the county of Cook and State of Illinois, have invented certain new and useful Improvements in a Roller Bearing, of which the following is a full, clear, and exact description.

My present invention relates to anti-friction bearings and has more particular reference to that form of anti-friction bearings in which disk rollers are employed as the anti-friction elements between the cone and cup, or inner and outer relatively rotating parts.

When disks or cylinders are employed as anti-friction elements in such bearings in an angular relation to the axis of rotation there is a difference in the length of the roller paths as they recede from the axis of rotation. As the rollers are solid and must rotate uniformly the differential above alluded to develops friction between the rollers and the surfaces with which they contact. It has heretofore been sought to overcome this differential and resultant friction, first, by tapering the rollers, and second, by reducing the thickness of the rollers so as minimize the differential and friction. Such narrowing of the rollers is effective where the rate of revolution is comparatively slow, as the heat developed by the friction radiates as fast as it is generated, but with high speeds of rotation, such as are becoming constantly more generally demanded in engineering practice, the presence of an appreciable differential results in such a heating of the bearing as to destroy the lubricant and lead to a quick destruction of the entire bearing.

I have found that in high speed bearings the differential between the rollers and the inner bearing member or cone is of much less importance than the differential between the rollers and the outer bearing member or cup, probably because of the centrifugal effect. My present invention overcomes the differential and resultant friction between the rollers and the outer bearing member or cup by forming the cup with slightly crowned or convex roller paths which reduce the contact between the rollers and the outer bearing member or cup more nearly to a line, depending upon the convexity of the paths provided. While the securing of a line contact for the disk roller elements is peculiarly desirable with high-speed bearings it is also of advantage in all classes of roller bearings on account of the elimination of such differential which at no time is of any advantage. Another important advantage of my present form of bearing lies in the fact that the rotation of the rollers upon their crowned or convexed tracks or paths develops a spinning action which tends to compress and solidify the track instead of merely abrading the same so that my form of bearing continually improves throughout a reasonable length of service.

I prefer to carry out my invention in substantially the manner hereinafter fully described and as more particularly pointed out in the claims, reference being now had to the accompanying drawings that form a part of this specification, in which—

Figure 1:
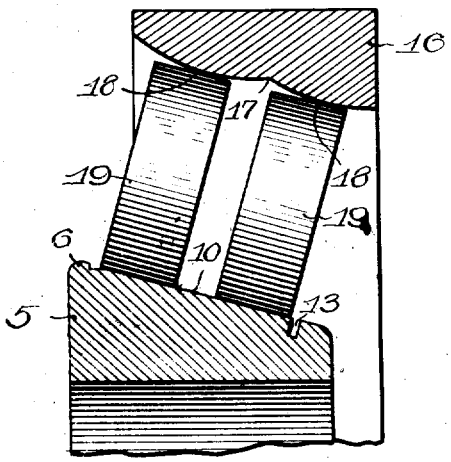
Figure 1 is a fragmental axial section of my improved bearing drawn schematically.
Figure 5:
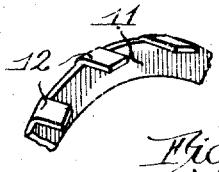
Figure 5 is a fragment of a roller spacing member.
Figure 3:
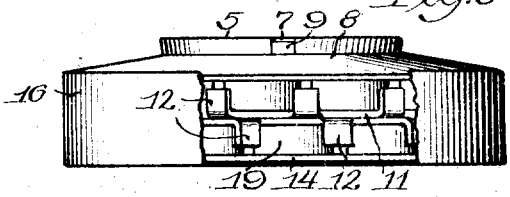
Figure 3 is an edge view partly broken away.
Figure 2:
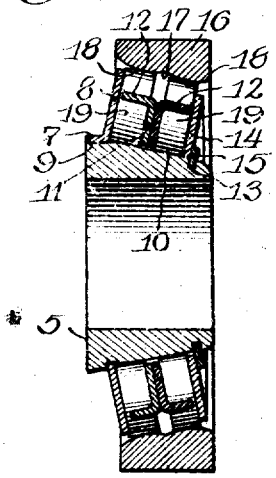
Figure 2 is an axial section showing the structure in detail.
Figure 4:
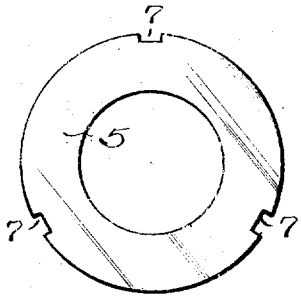
Figure 4 is a detail of the base of the cone.

The cone or inner bearing member 5 of my improved bearing is shouldered or annularly flanged as at 6 near one end, the flange being recessed at a plurality of points 7. The inner member 5 may be a cone as above stated, or a cylinder if desired. Fitting over the inner bearing against the shoulder or flange 6 is a washer 8 with lateral tangs 9 adapted to enter the recesses 7 in the flange. The washer 8 is to be so formed as to stand at substantially a right angle to the bearing surface 10 of the cone or other central inner bearing member. I next provide roller-spacers consisting of rings 11 of a size to permit of the projection of the rollers 19 both within and without the same when they are oriented with the bearing members. These rings 11 are provided with spaced tangs 12 each disposed at a right angle which tangs extend between and circumferentially space the individual rollers. The planes of the rings 11 should be parallel with the plane of the washer 8 before mentioned. When a set of rollers 19 with a spacer have been placed upon the cone a circumferential series of roller elements will be provided therefor. It is apparent that any desired number of rollers and spacers may be provided depending upon the thickness of the rollers and the width of the bearing surface 10 of the cone. The end of the cone opposite to that provided with shoulder or flange 6 is provided with a circumferential groove 13 and the rollers and spacers assembled on the cone are retained therein by a washer 14 and a split spring ring 15 which latter is snapped into the groove 13. The washer 14 should, of course, have the same angular relation to the axis of rotation as that of the washer 8.

The outer or cup bearing member 16 differs from the conventional cup member in that its inner wall or bearing face is channeled at 17 to provide roller paths 18 of convex section. With conical bearings or bearings in which end-thrust develops it is desirable to have the crest of the curve so disposed that the end-thrust will press the roller toward the crest thereby developing the spinning and solidifying action hereinbefore alluded to.

While I have herein illustrated and described but a single specific form of my invention it will be obvious to others skilled in the art that divers modifications and refinements thereof are possible without departing from the principles involved. I therefore desire it understood that all such changes or alterations are fully contemplated as coming within the scope of the appended claims.

What I claim is:—

1. An anti-friction bearing comprising inner and outer bearing members, a plurality of groups of disks, the disks of each group arranged in series and interposed between said members, and annular retainers arranged back to back between the respective groups of disks and having lateral elements projecting in opposite directions to space the disks in the respective series, one of said bearing members having convex faces to contact separately with a portion of the periphery of each disk and the other bearing member having a straight face to contact with all of the periphery of each disk.

2. An anti-friction bearing comprising inner and outer bearing members, a plurality of groups of disks, the disks of each group arranged in series and interposed between said members, and annular retainers arranged back to back between the respective groups of disks and having lateral elements projecting in opposite directions to space the disks in the respective series, said outer bearing member having convex faces to contact a portion of the periphery of each disk and the inner bearing member being conical to engage the entire periphery of each disk.

3. An anti-friction bearing comprising inner and outer bearing members, a plurality of groups of disks, the disks of each group arranged in series and interposed between said members, and annular retainers having lateral elements to space the disks in the respective series, one of said bearing members having convex faces to contact separately with a portion of the periphery of each disk and the other bearing member having a straight face to contact with all of the periphery of each disk.

4. An anti-friction bearing comprising inner and outer bearing members, a plurality of groups of disks, the disks of each group arranged in series and interposed between said members, and annular retainers having lateral elements to space the disks in the respective series, said outer bearing member having convex faces to contact a portion of the periphery of each disk and the inner bearing member being conical to engage the entire periphery of each disk.

5. An anti-friction bearing comprising a conical bearing member, an annular bearing member surrounding said conical member, a plurality of disks arranged in successive order and interposed between said conical and annular members, one of said bearing members having a convex face to contact with a portion of the width of the rolling face of each disk and the other bearing member having a straight face to contact the entire width of the rolling face of each disk, an annular retainer having lateral elements to space the disks, and means for maintaining the disks and retainer in assembly.

Signed at Chicago, county of Cook, and State of Illinois this 21st day of April, 1924.

FREDERICK GEORGE SEIFARTH.